United States Patent [19]

Kephart

[11] 4,236,795
[45] Dec. 2, 1980

[54] PRECISION PHOTOGRAPHIC DOCUMENTATION APPARATUS

[75] Inventor: Richard E. Kephart, Balboa Island, Calif.

[73] Assignee: H. George Brennan, Newport Beach, Calif.

[21] Appl. No.: 4,399

[22] Filed: Jan. 18, 1979

[51] Int. Cl.³ .................. G03B 29/00; G03B 15/00; G03B 17/00
[52] U.S. Cl. .................................. 354/80; 354/291; 354/292; 354/293
[58] Field of Search ........... 354/80, 292, 291, 293-294

[56] References Cited

U.S. PATENT DOCUMENTS

| | | | |
|---|---|---|---|
| 2,163,125 | 6/1939 | Jeffreys et al. | 354/80 |
| 2,981,147 | 4/1961 | Carter et al. | 354/80 |
| 3,437,022 | 4/1969 | Hamonds, Jr. | 354/80 |

Primary Examiner—George H. Miller, Jr.
Assistant Examiner—Thomas H. Tarcza
Attorney, Agent, or Firm—Philip M. Hinderstein

[57] ABSTRACT

There is disclosed apparatus for use in precision photographic documentation including a stationary platform for supporting a subject in the center thereof, a turntable mounted relative to the platform for rotation about an axis aligned with the center thereof, a vertical post mounted adjacent one side edge of the turntable for rotation around the platform, a camera mounting means and a camera being positioned on the vertical post for taking pictures of the subject as the turntable rotates around the platform, and a vertical photographic backdrop mounted on an opposite side edge of the turntable for rotation therewith.

11 Claims, 6 Drawing Figures

PRECISION PHOTOGRAPHIC DOCUMENTATION APPARATUS

BACKGROUND OF THE INVENTION

1. Field of the Invention

The present invention relates to precision photographic documentation apparatus and, more particularly, to precision apparatus for use in photgraphing a subject in a controlled and repeatable manner.

2. Description of the Prior Art

In the field of plastic surgery, there is a significant need for sophisticated apparatus to permit precise documentation of the surgeon's results. As a practical matter, since that which is significant is the appearance of the patient before and after surgery, photography is the usual means of documentation. As a result, photography has become an essential part of the everyday practice of plastic surgery, as well as elsewhere.

In using photographic documentation in plastic surgery, it is important to develop an accurate and consistent method of taking photographs. If this is not done, the results will be suspect. Changing film, cameras, lenses, or distances from one picture to another can result in widely differing results.

It is obvious that photographs must be taken in a way such that pre and post operative photographs are identical. In other words, the apparatus selected must permit standardization of the photographic technique for comparison purposes. In this regard, it is obvious that the same camera, lens, and film should be used for before and after photographs. What is also required is that the patient position be uniform, that the distance from the film to the subject be constant and repeatable, and that there be consistency in lighting and background. The consistency in lighting requires the lights to be placed consistently in both distance and angular orientation.

While these requirements have been recognized heretofore, it has still been left for implementation to the skills of the surgeon or technician. Thus, it has been typical to use a single camera and lens and for the entire process to be done by hand, simply attempting to proceed in as accurate and repeatable a manner as possible.

SUMMARY OF THE INVENTION

According to the present invention, there is provided precision photographic documentation apparatus which permits pre and post operative photographs to be taken under identical circumstances so that an accurate comparison can be made of pre and post operative conditions. With the present apparatus, the distance from the film to the subject is contant and repeatable. The present apparatus provides consistent lighting and a consistent background. The patient position is uniform, as are all other variables.

The present apparatus does not require operation by a skilled technician. Once the patient is positioned, the apparatus literally does all of the work, not only taking carefully controlled pictures, but also automatically taking pictures at pre-selected angles. Therefore, in using the present apparatus, consistently precise records may be established.

Briefly, the present apparatus for use in precision photographic documentation comprises a stationary platform for supporting a subject in the center thereof, a turntable mounted relative to the platform for rotation about an axis aligned with the center thereof, a vertical post mounted adjacent one side edge of the turntable for rotation around the platform, means for mounting a camera on the post, and a vertical photographic backdrop mounted on an opposite side edge of the turntable whereby the camera mount and backdrop rotate together around the subject, on opposite sides thereof, permitting pre and post operative photographs to be taken under identical circumstances.

OBJECTS, FEATURES AND ADVANTAGES

It is therefore an object of the present invention to solve the problem of providing precision photographic documentation in plastic surgery. It is a feature of the present invention to solve this problem by providing apparatus which permits standardization of the technique for producing photographic documentation for accurate comparison purposes. An advantage to be derived is that pre and post operative photographs can be taken under identical circumstances. Another advantage is that the common pitfalls involved in scientific comparative photography are eliminated.

It is a further object of the present invention to solve the problems associated with consistency in lighting and background in precision photographic documentation. It is a feature of the present invention to solve these problems by providing apparatus in which the lighting and background are mounted in fixed positions, which lighting and background move around the subject with the camera used in taking photographs. An advantage to be derived is that each and every picture is taken with the same lighting, in the same position, at the same distance from the subject, and with a consistent background.

It is a still further object of the present invention to solve the problems associated with the taking of photographs in predetermined positions relative to a subject. It is a feature of the present invention to solve these problems by mounting a camera on a turntable which rotates around the subject, which camera is automatically fired at predetermined positions. The advantage to be derived is that pre and post operative photographs are taken at the same distance from the subject and at identical angular positions.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
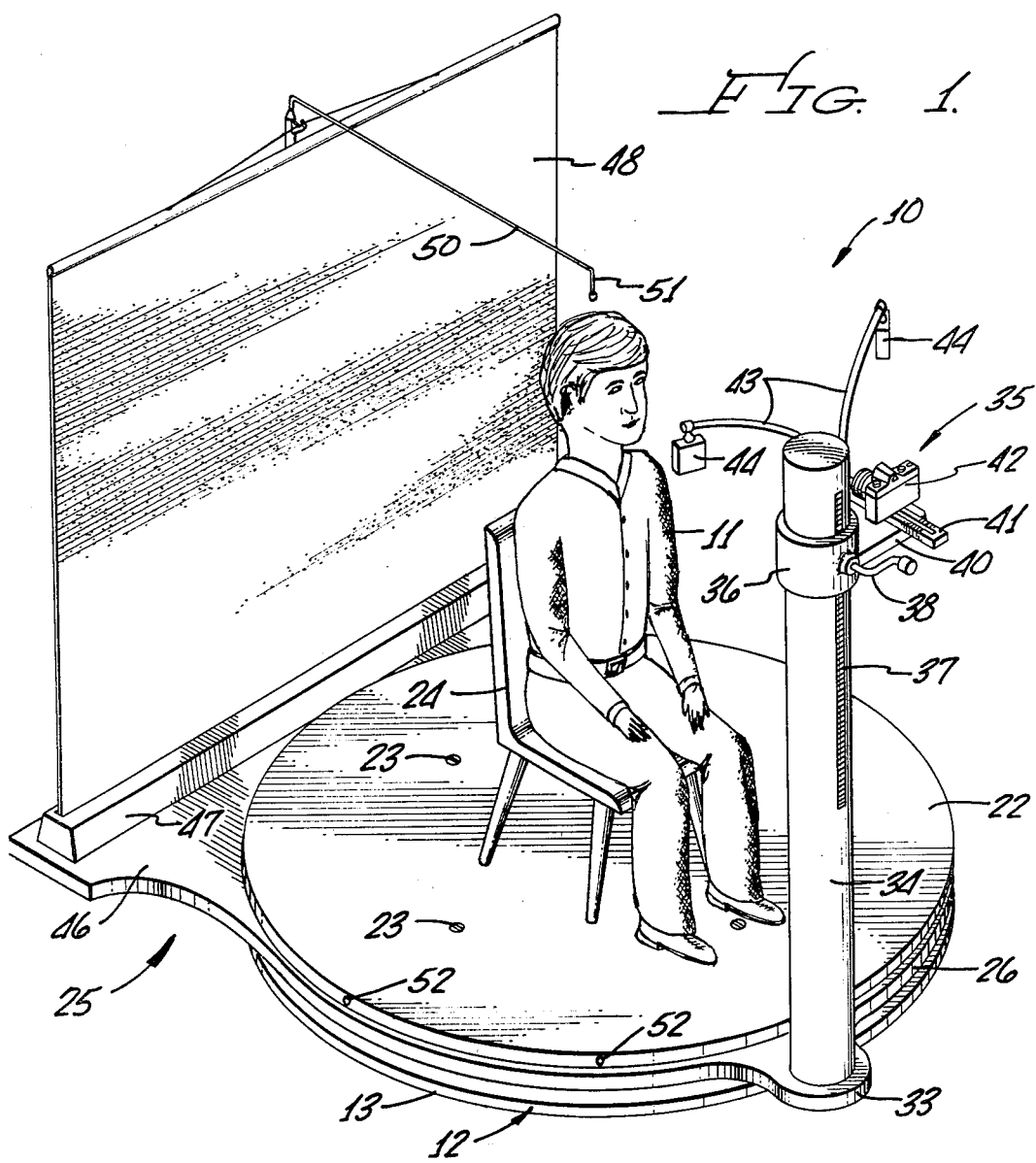
FIG. 1 is a perspective view of the present apparatus for use in photographing a subject, with a subject shown in operative position ready to be photographed.

Referring now to the drawings, there is shown apparatus, generally designated 10, for the precision photographic documentation of a subject, such as a patient 11. Apparatus 10 includes a base 12 adapted for mounting on a horizontal support surface, such as on the floor of a room in which photographic apparatus 10 is to be used. Base 12 includes a circular baseplate 13 having planar upper and lower surfaces. Mounted on the planar upper surface of baseplate 13 are a plurality of support blocks 14. Each support block 14 supports a guide means 15, each guide means 15 including a roller 16 mounted for rotation on a vertical shaft 17 connected to one arm 18 of an L-shaped member 19. The other arm 20 of member 19 is connected to a side of support block 14, such as by means of screws 21.

Figure 5:
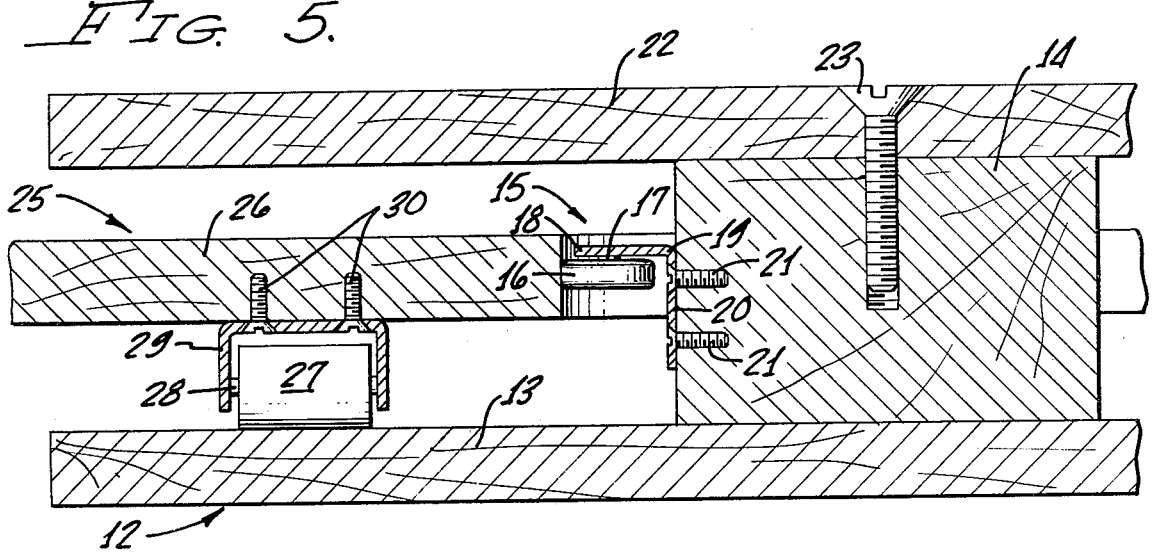
FIG. 5 is an enlarged, partial sectional view taken along the line 5—5 in FIG. 2.

Apparatus 10 further includes a stationary platform 22 which is also preferably a circular member having planar upper and lower surfaces and approximately the same diameter as baseplate 13, platform 22 being mounted on support blocks 14. As shown in FIG. 5, a plurality of screws 23 may be utilized to connect platform 22 to support blocks 14. As will be explained more fully hereinafter, subject 11 is adapted to be positioned on platform 22 and aligned with the center thereof, subject 11 preferably sitting on a chair 24 on platform 22.

Figure 4:
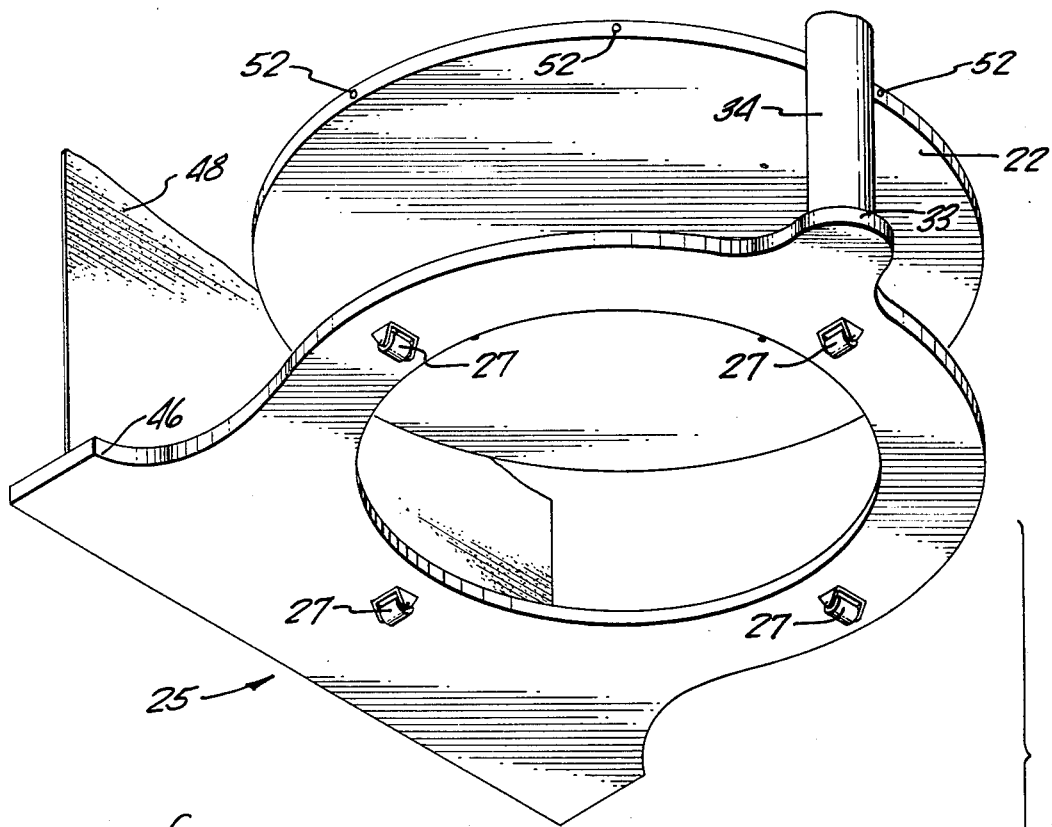
FIG. 4 is an exploded perspective view of the base, turntable, and platform of the apparatus of FIG. 1.

Apparatus 10 further includes a turntable, generally designated 25, which is mounted relative to base 12 and platform 22 for rotation about an axis aligned with the center of platform 22. More specifically, turntable 25 comprises a generally ring-shaped member 26 having planar upper and lower surfaces and an outer diameter which is approximately equal to the outer diameters of baseplate 13 and platform 22. Member 26 has an inner diameter equal to the space between the outer edges of opposite rollers 16. More specifically, and as shown in FIGS. 4 and 5, member 26 is adapted to be mounted between baseplate 13 and platform 22, surrounding support blocks 14. When so positioned, rollers 16 engage the inner peripheral edge of turntable member 26 whereby rollers 16 guide turntable 25, ensuring rotation thereof about an axis aligned with the center of platform 22.

Figure 3:
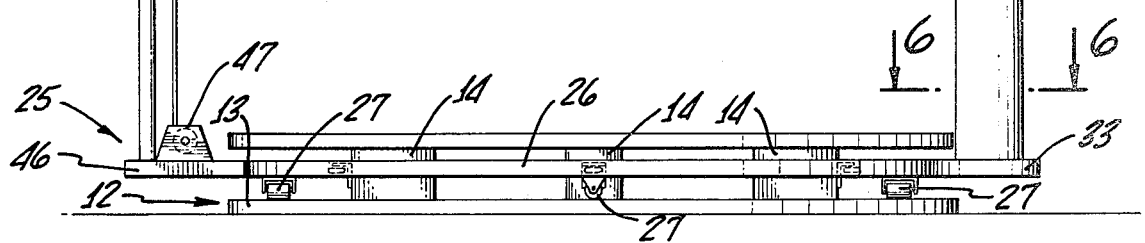
FIG. 3 is a side elevation view of the apparatus of FIG. 1.

Turntable 25 further includes a plurality of rollers 27 connected to the bottom surface thereof for engaging baseplate 13 and supporting turntable 25 for rotation relative thereto. Specifically, each roller 27 is mounted on a horizontal shaft 28, the opposite ends of which are connected to the opposite ends of U-shaped members 29, the centers of which are connected to turntable member 26 by screws 30. As should be evident from an inspection of FIGS. 3, 4, and 5, the multiple rollers 27 permit turntable 25 to freely rotate on the upper planar surface of baseplate 13, rollers 16 guiding turntable 25 during rotation thereof.

Turntable member 26 has a first radially outwardly protruding extension 33 on which is mounted a vertically extending post 34, the effect being to mount post 34 adjacent one side edge of turntable member 26 for rotation therewith. Post 34 supports camera and lighting mounting means, generally designated 35. While any suitable type of mounting means 35 may be employed, mounting means 35 here includes a collar 36 which surrounds post 34 and is vertically movable relative thereto. For example, post 34 may have a rack 37 made integral therewith engagable by a gear (not shown) within collar 36 and rotatable by means of a handle 38 whereby rotation of handle 38 elevates or lowers collar 36 relative to post 34. Collar 36 supports an arm 40 which extends horizontally therefrom, mounted on which is a track 41. A camera 42 is mountable on track 41 in a conventional manner so as to be movable horizontally relative thereto. Also mounted on arm 40 are first ends of a pair of arms 43 which extend upwardly and sidewardly therefrom. Conventional electronic flash units or other lighting means 44 are connected to the other ends of arms 43. Thus, while collar 36 moves relative to post 34, arms 40 and 43 maintain flash units 44 in fixed positions relative to subject 11 seated on platform 22.

Turntable member 26 has a second radially outwardly protruding extension 46 on the side thereof opposite from extension 33, extension 46 having a box 47 mounted thereon in which may be rolled, in a conventional manner, a conventional photographic background screen 48. Also mounted on extension 46 is a vertically extendable post 49 for supporting screen 48 in its fully extended position, shown in FIGS. 1 and 3. When not in use, screen 48 may be retracted into box 47 and extendable post 49 lowered. The upper end of post 49 has a horizontally extending section 50 which terminates in a vertically downwardly extending section 51 which is aligned with the center of platform 22 and the axis of rotation of turntable 25.

Figure 2:
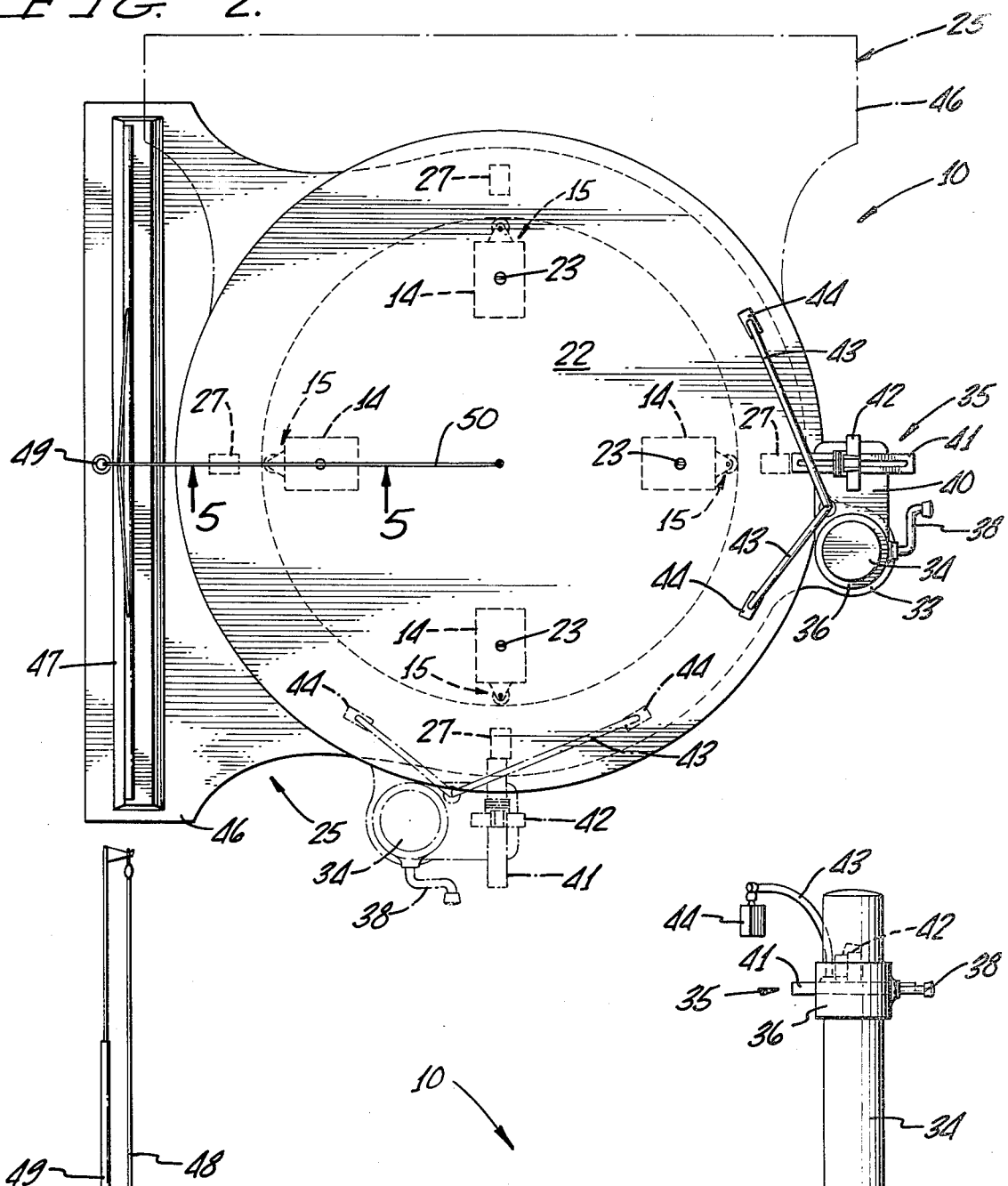
FIG. 2 is a top plan view of the apparatus of FIG. 1 with the turntable shown in two different positions in solid lines and in phantom.
Figure 6:
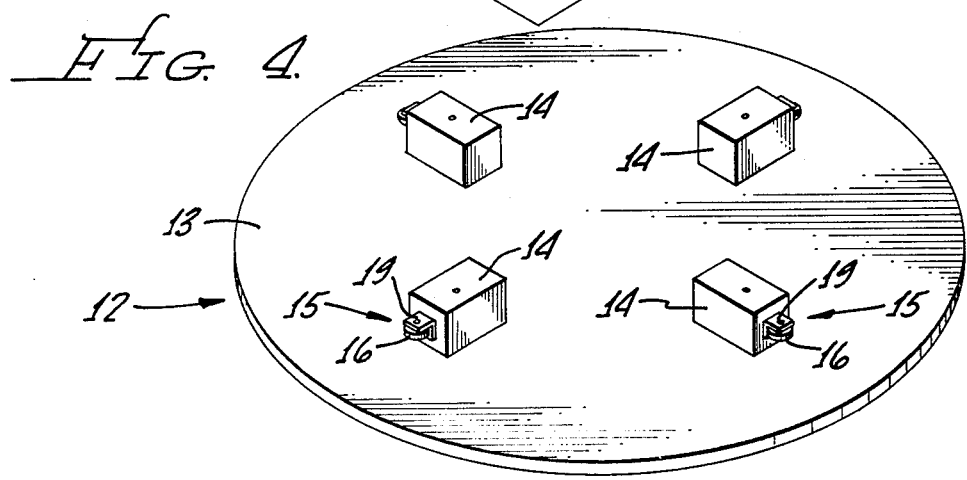
FIG. 6 is an enlarged, partial sectional view taken along the line 6—6 in FIG. 3.
Figure 6:
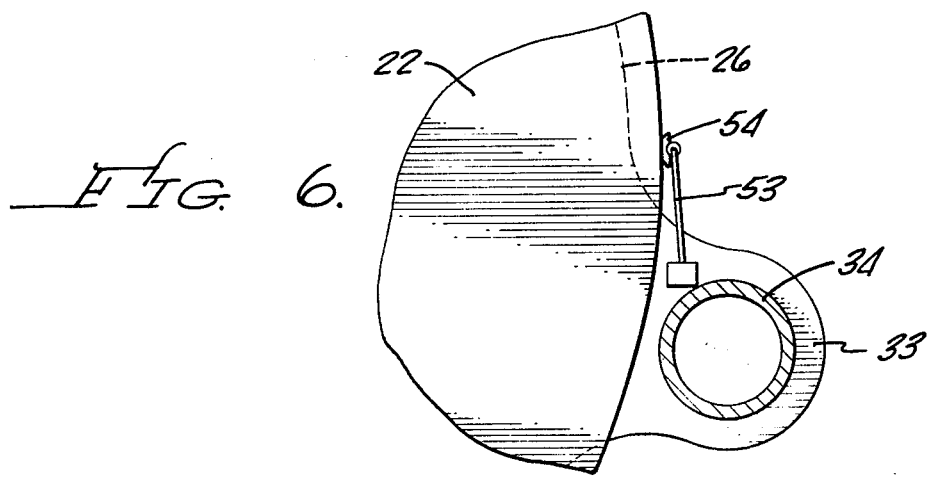

As will be explained more fully hereinafter, apparatus 10 is useful in photographing subject 11 from a variety of different angular positions while subject 11 is positioned on platform 22. To define these positions, which are preferably facing directly at subject 11, the 0° position, shown in FIGS. 1 and 2, and positions at 45° angles and 90° angles on the opposite sides of the 0° position, a plurality of magnets 52 are positioned in the outer peripheral edge of platform 22. These magnets 52 define the 0°, ±45°, and ±90° positions. Furthermore, and as shown in FIG. 6, mounted on extension 33 is an arm 53 which supports a magnetically-actuated switch 54 positioned so as to engage the outer peripheral edge of platform 22 during rotation of turntable 25. Switch 54 is a conventional switch for generating an output signal each time it passes one of magnets 52. The signal output of switch 54 (not shown) may be conducted to camera 42.

In operation, before subject 11 is positioned on platform 22, camera 42 on mounting means 35 may be aligned by focusing camera 42 on section 51 of post 49 with camera 42 positioned at the 0° position of turntable 25. Thereafter, turntable 25 may be rotated to any of the other positions defined by magnets 52 and the focus of camera 42 checked. If camera 42 is accurately located on mounting means 35, the position of section 51 within the viewfinder of camera 42 and the focus thereof will remain stationary as turntable 25 is rotated.

When it is time to photograph subject 11, he may be positioned on chair 24 on platform 22 where he can be readily positioned by the technician who instructs subject 11 to position himself while the technician views subject 11 through the viewfinder of camera 42. For this purpose, a single lens reflex camera is preferred for camera 42. Thus, while the technician looks at subject 11 through the viewfinder of camera 42, the subject 11 can be told to move forwardly or backwardly or from side to side to center within the viewfinder of camera 42 that part which is to be photographed. Once the side to side position of subject 11 is established, camera 42 can be moved to one of the 90° positions to check the forward and back positions of subject 11. Simply moving turntable 25 between the 0° position and one of the 90° positions highly simplifies the procedure for positioning subject 11.

With subject 11 accurately positioned, with screen 48 in its raised position, and with camera 42 loaded with film, the procedure for photographing subject 11 may readily proceed. In the preferred embodiment of the invention, camera 42 has a motorized film advance and the triggering of camera 42 is made responsive to the electrical signal output of switch 54. In such case, turntable 25 is first rotated to one of the 90° positions by the operator. Thereafter, the technician will simply walk around platform 22, moving turntable 25 around subject 11. Each time switch 54 passes one of magnets 52, camera 42 and flash units 44 will be activated to take a picture. The motorized film advance will then advance the film so that camera 42 is again ready to take another photograph when switch 54 passes the next magnet 52. It can therefore be appreciated that within a matter of a few seconds, within the time it takes for a technician to walk around platform 22, five photographs of subject 11 can be taken under precise conditions suitable for photographic documentation.

In a simpler version of apparatus 10, magnets 52 and switch 54 need not be provided and it would not be necessary to have a motorized film advance for camera 42. Rather, predetermined marks could be located on platform 22 and photographs taken manually each time turntable 25 is aligned with one of these marks. This procedure should allow for equally accurate photographs, it would just be more time-consuming.

It can therefore be seen that according to the present invention, there is provided precision photographic documentation apparatus 10 which permits pre and post operative photographs to be taken under identical circumstances so that an accurate comparison can be made of pre and post operative conditions. That is, the above-described procedure can be followed at a later time to again photograph subject 11 and the second series of photographs should be identical to the first series. This is so because with apparatus 10, the distance from the film to the subject is constant and repeatable. Apparatus 10 provides consistent lighting and a consistent background. The position of subject 11 is uniform, as are all other variables.

Apparatus 10 does not require operation by a skilled technician. Once subject 11 is positioned, apparatus 10 literally does all of the work, not only taking carefully controlled pictures, but also automatically taking pictures at preselected angles. Therefore, in using apparatus 10, consistently precise records may be established.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. Apparatus for use in photographing a subject comprising:
    a stationary plaform for supporting said subject in the center thereof;
    a turntable mounted beneath said platform for rotation about an axis aligned with said center of said platform;
    a vertical post mounted adjacent one side edge of said turntable for rotation around said platform;
    means for mounting a camera on said post; and
    a vertical photographic backdrop mounted on an opposite side edge of said turntable for rotation around said platform with said camera mounting means on an opposite side of said subject.

2. Apparatus according to claim 1, wherein the vertical position of said camera mounting means is adjustable relative to said platform.

3. Apparatus according to claim 1, further comprising:
    a base adapted for mounting on a horizontal support surface, said platform being rigidly mounted on said base.

4. Apparatus according to claim 3, wherein said base comprises:
    a baseplate adapted to be positioned on said horizontal support surface and having a planar upper surface; and
    support means mounted on said planar upper surface of said baseplate and extending vertically upwardly therefrom, said platform being mounted on said support means.

5. Apparatus according to claim 4, wherein said turntable comprises:
    a generally ring-shaped member mounted between said baseplate and said platform, surrounding said platform support means.

6. Apparatus according to claim 5, further comprising:
    roller means mounted between said turntable and said planar upper surface of said baseplate for supporting said turntable for rotation relative to said baseplate.

7. Apparatus according to claim 6, further comprising:
    guide means for supporting said turntable and for ensuring rotation thereof about said axis aligned with said center of said platform.

8. Apparatus according to claim 7, wherein said guide means comprises:
    a plurality of rollers mounted on said support means for engaging the inner peripheral edge of said turntable.

9. Apparatus according to claim 1, wherein said platform is a generally planar disc-shaped member and further comprising:
    means mounted at spaced positions at the outer peripheral edge of said platform for defining predetermined positions of said turntable relative to said platform; and
    means mounted on said turntable for generating an electrical signal as said turntable passes said predetermined positions on said platform, said signal being usable for automatically triggering a camera mounted on said vertical post for taking photographs of said subject at said predetermined positions as said turntable moves around the platform.

10. Apparatus according to claim 9, wherein said means mounted at said platform for defining predetermined positions comprises:
    a plurality of magnets, and wherein said signal generating means mounted on said turntable comprises:
    a magnetically actuated switch.

11. Apparatus according to claim 1, further comprising:
    means mounted on said turntable and suspended over said center of said platform for use in aligning a camera mounted on said post.

* * * * *